US008789966B2

(12) United States Patent
McCanless et al.

(10) Patent No.: US 8,789,966 B2
(45) Date of Patent: Jul. 29, 2014

(54) LED LIGHTING ASSEMBLY FOR FLUORESCENT LIGHT FIXTURES

(75) Inventors: Forrest McCanless, Oxford, GA (US); John D. DeMasie, Cochran, GA (US)

(73) Assignee: ABL IP Holding LLC, Conyers, GA (US)

(*) Notice: Subject to any disclaimer, the term of this patent is extended or adjusted under 35 U.S.C. 154(b) by 0 days.

(21) Appl. No.: 13/325,258

(22) Filed: Dec. 14, 2011

(65) Prior Publication Data

US 2012/0155073 A1 Jun. 21, 2012

Related U.S. Application Data

(60) Provisional application No. 61/423,872, filed on Dec. 16, 2010.

(51) Int. Cl.

| | |
|---|---|
| ***F21V 7/20*** | (2006.01) |
| ***F21S 4/00*** | (2006.01) |
| ***F21V 1/00*** | (2006.01) |
| ***F21V 5/00*** | (2006.01) |
| ***F21V 7/00*** | (2006.01) |
| ***F21V 29/00*** | (2006.01) |
| ***B60Q 1/06*** | (2006.01) |

(52) U.S. Cl.
USPC ...... 362/218; 362/223; 362/217.02; 362/294; 362/373

(58) Field of Classification Search
USPC ......... 362/218, 219, 222, 223, 225, 240, 246, 362/217.02, 249.02, 249.06, 800, 217.08, 362/294, 373
See application file for complete search history.

(56) References Cited

U.S. PATENT DOCUMENTS

| | | | | |
|---|---|---|---|---|
| 7,229,192 | B2 | 6/2007 | Mayfield, III et al. | |
| 7,261,435 | B2 | 8/2007 | Gould et al. | |
| 7,296,910 | B2 | 11/2007 | Mayfield, III et al. | |
| 7,455,422 | B2 * | 11/2008 | Gould et al. | 362/223 |
| 7,481,552 | B2 * | 1/2009 | Mayfield et al. | 362/223 |
| 7,510,305 | B2 | 3/2009 | Straton et al. | |
| 7,530,716 | B2 | 5/2009 | Mayfield, III et al. | |
| 7,588,347 | B1 * | 9/2009 | Edwards, Jr. | 362/225 |
| 2005/0207166 | A1 * | 9/2005 | Kan et al. | 362/373 |
| 2005/0225979 | A1 * | 10/2005 | Robertson et al. | 362/240 |

(Continued)

OTHER PUBLICATIONS

Office Action for Canadian Application No. CA 2,762,143, mailed May 17, 2013 (3 pages).

*Primary Examiner* — Peggy Neils
*Assistant Examiner* — Erin Kryukova
(74) *Attorney, Agent, or Firm* — Kilpatrick Townsend & Stockton, LLP

(57) ABSTRACT

Described are LED lighting assemblies that may be used to replace a light source in a light fixture. The LED lighting assembly may include a thermally conductive extrusion, a plurality of light emitting diodes, and a diffuser. The diffuser is positioned below the light emitting diodes and also releasably engages the extrusion. The light fixture may include a housing, a reflector assembly with at least one longitudinally extending trough, at least one light source, and at least one lens assembly. As an example, the at least one lens assembly and the at least one light source are removed, and at least one LED lighting assembly is provided. At least a portion of the extrusion of the at least one LED lighting assembly is placed adjacent the at least one longitudinally extending trough. The diffuser of the at least one LED lighting assembly is connected to the at least one longitudinally extending trough.

13 Claims, 12 Drawing Sheets

(56) References Cited

U.S. PATENT DOCUMENTS

2006/0146531 A1* 7/2006 Reo et al. .................... 362/244
2007/0211457 A1 9/2007 Mayfield, III et al.
2008/0030981 A1* 2/2008 Mrakovich et al. ........... 362/219
2008/0298058 A1* 12/2008 Kan et al. .................... 362/240
2009/0046457 A1* 2/2009 Everhart ....................... 362/235
2009/0141487 A1 6/2009 Gould et al.
2009/0207603 A1 8/2009 Lydecker et al.
2009/0290334 A1* 11/2009 Ivey et al. .................... 362/219
2011/0156584 A1 6/2011 Kim

* cited by examiner

LED LIGHTING ASSEMBLY FOR FLUORESCENT LIGHT FIXTURES

CROSS REFERENCE TO RELATED APPLICATION

This application claims the benefit of U.S. Provisional Application Ser. No. 61/423,872, filed on Dec. 16, 2010, entitled LED LIGHTING ASSEMBLY FOR FLUORESCENT LIGHT FIXTURES. The '872 application is hereby incorporated herein in its entirety by this reference.

FIELD OF THE INVENTION

This invention relates to light fixtures for illuminating architectural spaces, particularly light emitting diode-based light sources for use in existing fluorescent light fixtures.

BACKGROUND

Traditional light fixtures presently used in a typical office environment comprise a troffer with at least one fluorescent lamp and a lens having prismatic elements for distributing the light. Typical light fixtures may also use parabolic reflectors to provide a desired light distribution. The fluorescent lamp has long been the light source of choice among lighting designers in many commercial applications, particularly for indoor office lighting. A description of such a fluorescent light fixture may be found in U.S. Pat. No. 7,229,192, the contents of which is hereby incorporated by reference.

For many years the most common fluorescent lamps for use in indoor lighting have been the linear T5 (⅝ inch diameter), T8 (1 inch diameter), and the T12 (1½ inch diameter). Such bulbs are inefficient and have a relatively short lamp life. Thus, efforts have been made to identify suitable alternative illumination sources for indoor office lighting applications. Light emitting diodes ("LEDs") have been identified as one alternative to traditional fluorescent bulbs.

An LED typically includes a diode mounted onto a die or chip, where the diode is surrounded by an encapsulant. The die is connected to a power source, which, in turn, transmits power to the diode. An LED used for lighting or illumination converts electrical energy to light in a manner that results in very little radiant energy outside the visible spectrum. LEDs are extremely efficient, and their efficiency is rapidly improving. For example, the lumen output obtained by 20 LEDs may soon be obtained by 10 LEDs.

However, in comparison to simply changing a light bulb in a conventional light fixture, exchanging an existing fluorescent fixture for a light fixture that uses LEDs as a light source can be labor intensive and costly. Such replacement typically requires access to the area above the ceiling. Environmental concerns, such as asbestos contamination and asbestos removal, become an issue when disturbing the ceiling. Moreover, the area above the ceiling collects dirt and dust, which can dislodge during LED replacement and thereby increase the time and cost of clean-up after installation. Additionally, exposed electrical wiring is common in such areas, which creates a safety hazard for workers removing old fixtures. A licensed electrician may be required to install the new fixtures based upon common safety codes. Thus, consumers are reticent to invest in a new LED light fixture when the effort and costs are compared to maintaining an existing fluorescent light fixture.

Efforts have also been made to retrofit an existing fluorescent light fixture with an LED light source. However, in an LED light source, the heat generated by the lamp may cause problems related to the basic function of the lamp and light fixture. Specifically, high operating temperatures degrade the performance of the LED lighting systems. Typical LED lighting systems have lifetimes approaching 50,000 hours at room temperature; however, the same LED lighting system has a lifetime of less than 7,000 hours when operated at close to 90° C. Thus, many retrofit LED light sources do not provide the anticipated benefits or longer life due to inadequate thermal dissipation. Therefore, there exists a need for an LED light source with adequate heat removal that can be retrofitted into an existing fluorescent light fixture.

SUMMARY

Embodiments of the invention provide LED lighting assemblies for light fixtures with fluorescent light sources, but may be used in light fixtures of any type. In one embodiment, the LED lighting assembly comprises a thermally conductive extrusion, a plurality of light emitting diodes, and a diffuser. In some embodiments, the light emitting diodes may be positioned on a printed circuit board, which is then positioned adjacent the extrusion. The diffuser is positioned below the light emitting diodes and also releasably engages the extrusion.

The LED lighting assembly may be used to replace a light source in a light fixture. In these embodiments, the light fixture comprises a housing, a reflector assembly with at least one longitudinally extending trough, at least one light source, and at least one lens assembly. The at least one lens assembly and the at least one light source are removed, and at least one LED lighting assembly is provided. At least a portion of the extrusion of the at least one LED lighting assembly is placed adjacent the at least one longitudinally extending trough and mounted to the trough via diffuser connections that releasably engage connections on the trough surfaces. The diffuser of the at least one LED lighting assembly is connected to the at least one longitudinally extending trough.

DETAILED DESCRIPTION

Figure 1:
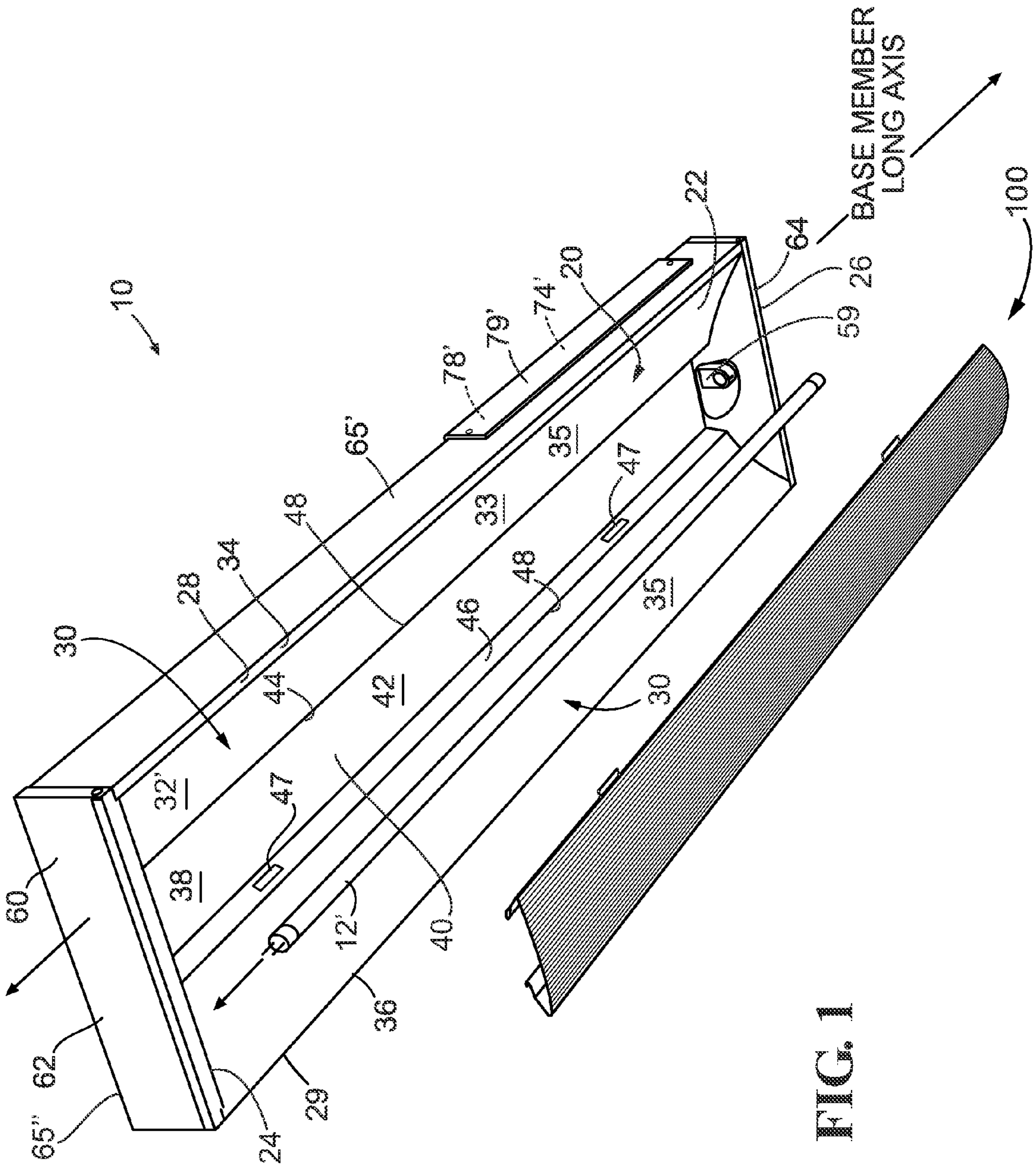
FIG. 1 is an exploded bottom perspective view of one embodiment of the light fixture of the present invention with an existing fluorescent light source.
Figure 2:
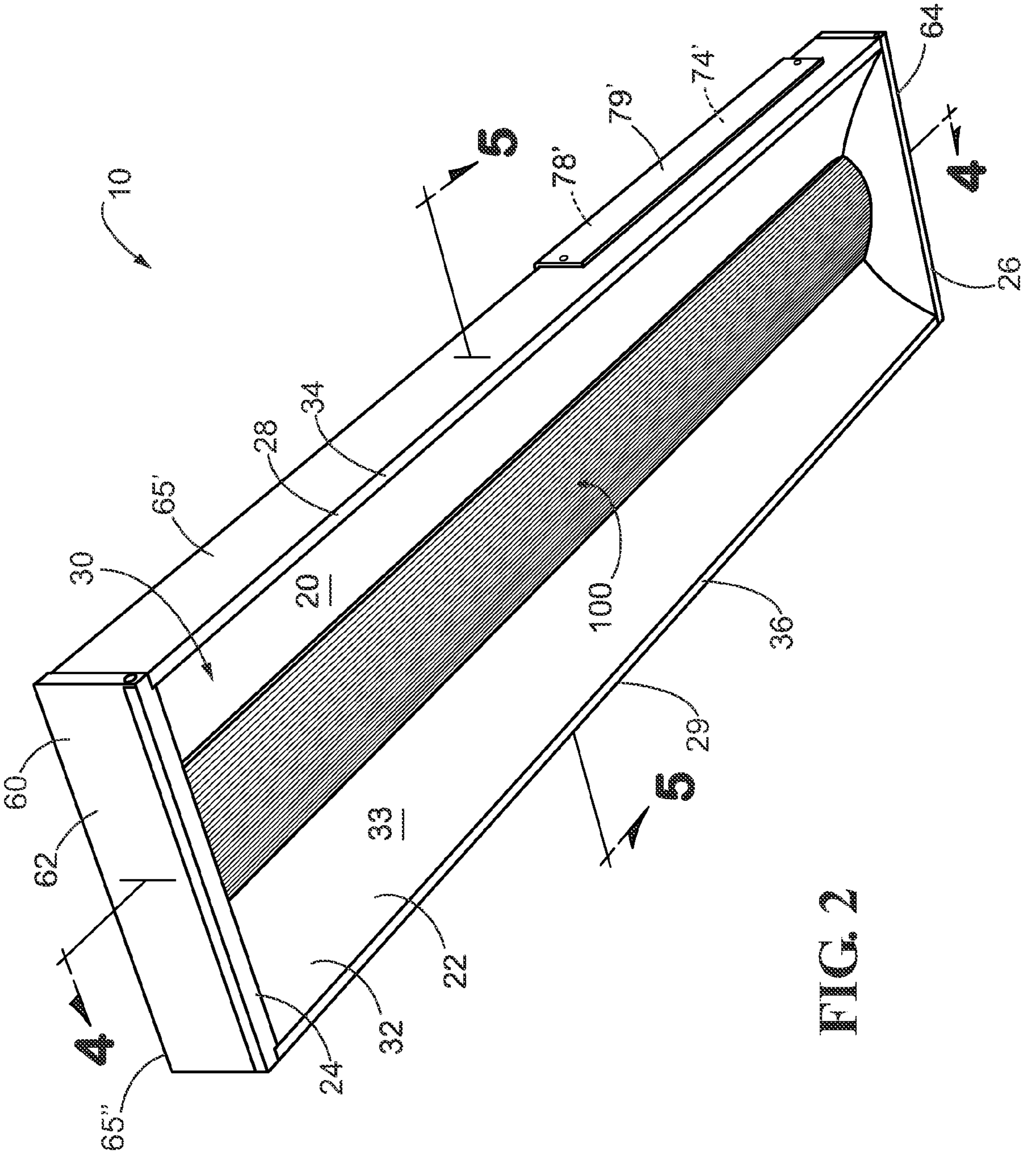
FIG. 2 is a bottom perspective view of the light fixture of FIG. 1.

Embodiments of the present invention contemplate replacing a fluorescent light source within an existing light fixture with an LED lighting assembly. Embodiments of such a light fixture are shown and described in U.S. Pat. No. 7,229,192, which is incorporated herein by reference. In these embodiments, as shown in FIGS. 1-7, a light fixture 10 includes basic components, such as a reflector assembly 20, a housing 60, and a fluorescent light source 12'. Light emanating from the fluorescent light source 12' is diffused by a fluorescent lens assembly 100 that is positioned between the fluorescent light source 12' and the area to be illuminated. The fluorescent light source 12' may be a conventional fluorescent lamp, and in one embodiment, the fluorescent light source 12' can be a conventional T5 lamp.

As shown in FIGS. 1-4, the reflector assembly 20 of light fixture 10 includes an elongated base member 22 that has a first end edge 24, a spaced second end edge 26, a first longitudinally extending side edge 28 and an opposed second longitudinally extending side edge 29. The base member 22 further has a base surface 30 extending along a base longitudinal axis. The base member 22 can be formed from a single piece of material or from a plurality of adjoined pieces. As one of skill in the art would understand, the reflector assembly 20 can be formed from any code-compliant material. For example, the base member 22 can be formed from steel.

A portion of the base surface 30 of the base member 22 forms at least one longitudinally extending hollow 32 that extends inwardly in the transverse dimension with respect to and away from the respective first and second longitudinally extending side edges 28, 29. Each hollow 32 has a first hollow edge 34 and a second hollow edge 36 and extends inwardly toward a central portion 38 defined by and between the respective first and second hollow edges 34, 36. The central portion 38 defines a longitudinally extending trough 40 that extends inwardly away from the surface of the hollow 32. At least a portion of each hollow 32 forms a reflective surface 33 extending between the central portion 38 and a respective one of the first and second hollow edges 34, 36. In one embodiment, at least a portion of a section of each hollow 32 normal to the base member longitudinal axis has a generally curved shape such that portions of the hollow 32 form a generally curved reflective surface 35 for diffusely reflecting light received from the lens into the architectural space in a desired pattern. In one embodiment, the transverse section of the hollow 32 can have a conventional barrel shape. In an alternative embodiment, a portion of each hollow 32 can have at least one planar portion.

In some embodiments, at least a portion of the hollow of the base surface 30 of the base member 22 can be painted or coated with a reflective material or formed from a reflective material. The reflective material may be substantially glossy or substantially flat. In one example, the reflective material may be matte white to diffusely reflect incident light.

The central portion 38 of the light fixture 10 is symmetrically positioned with respect to the first and second hollow edges 34, 36. The light fixture 10 can include one or more hollows 32' that each houses the fluorescent light source 12'. In one embodiment, in a light fixture having a single hollow, the first and second hollow edges 34, 36 of the hollow would extend generally to the respective longitudinally extending side edges 28, 29 of the base member 22.

Figure 5:
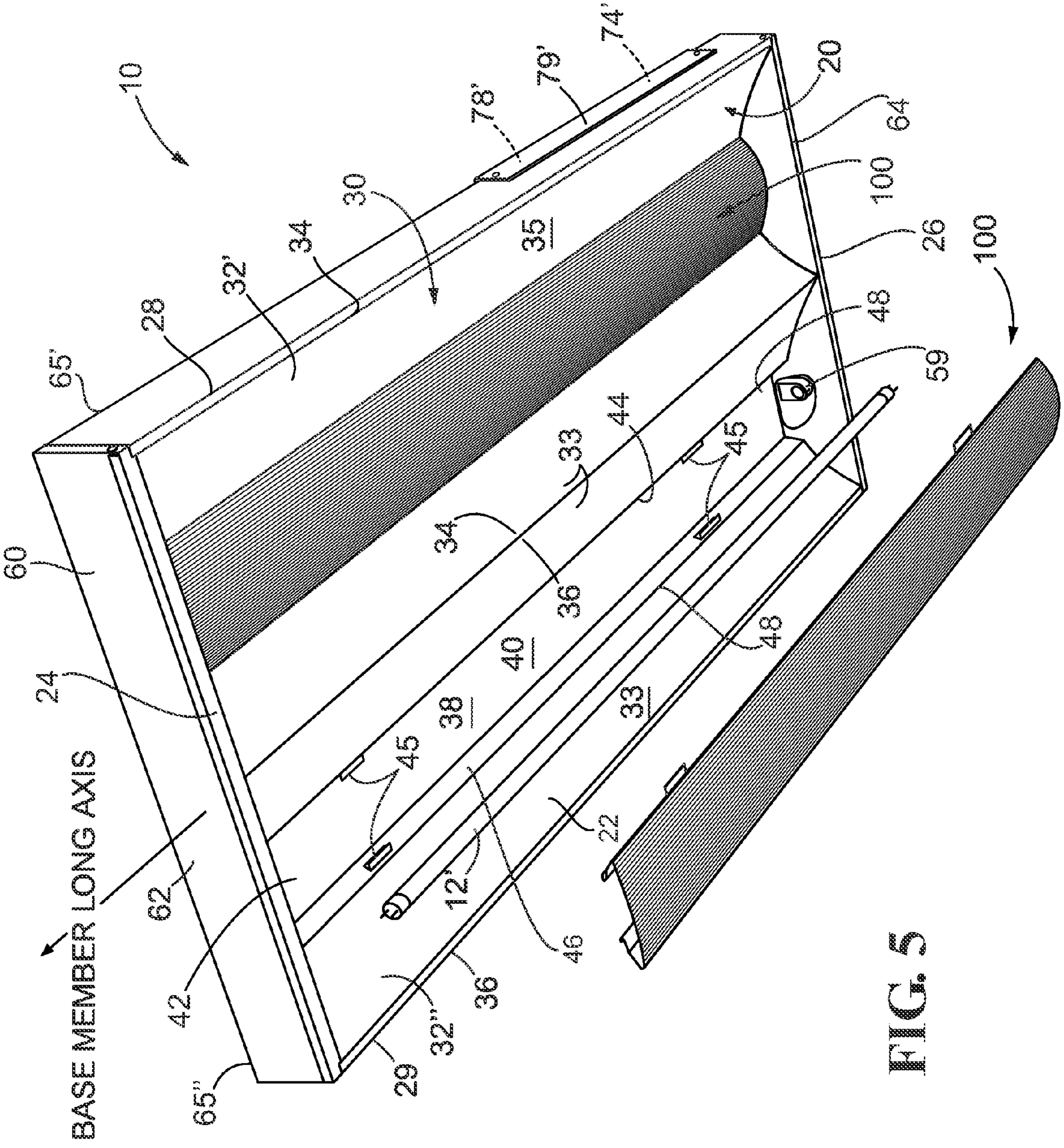
FIG. 5 is an exploded bottom perspective view of a second embodiment of the light fixture of the present invention with existing fluorescent light sources.

In an alternative embodiment, as shown in FIG. 5, in which the light fixture 10 has two hollows, the base member 22 defines a pair of adjoining, parallel hollows. Here, a first hollow edge 34 of a first hollow 32' extends generally to the first side edge 28 of the base member 22, and a second hollow edge 36 of a second hollow 32" of the pair of hollows extends generally to the second side edge 29 of the base member 22. The second hollow edge 36 of the first hollow 32' and the first hollow edge 34 of the second hollow 32" are adjoined in one embodiment (as shown in FIG. 5). Alternatively, the second hollow edge 36 of the first hollow 32' and the first hollow edge 34 of the second hollow 32" are positioned proximate or near each other.

The trough 40 is formed by a top surface 42, a first side trough surface 44, and an opposed second side trough surface 46, wherein the trough 40 is provided for receiving the fluorescent light source 12'. The trough 40 extends along an axis parallel to the longitudinal axis of the light fixture 10. The first and second side trough surfaces 44, 46 have a lower edge 48 that is integral with a portion of the adjoined hollow 32. In one embodiment, the lower edges 48 of the first and the second side trough surfaces 44, 46 are integral with the reflective surfaces 33 of the adjoined hollow 32.

Figure 3:
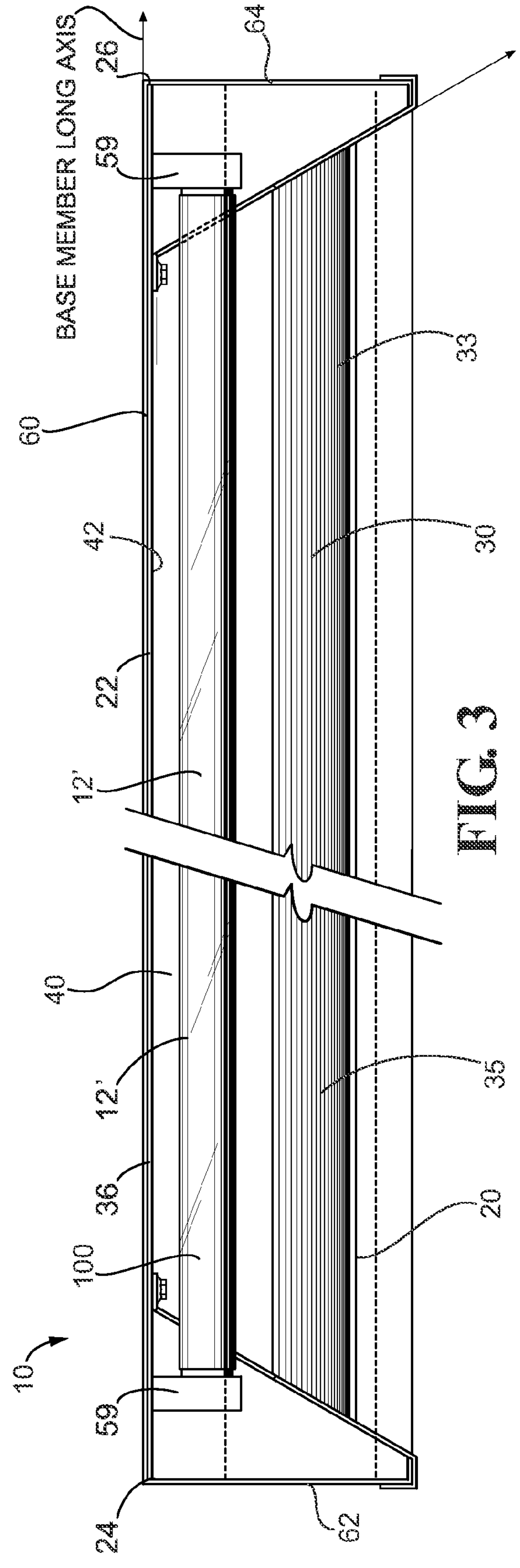
FIG. 3 is a cross-sectional view of the light fixture of FIG. 2, taken along line 4-4.

In some embodiments, the light fixture 10 also includes the housing 60 having a first end wall 62 and a second end wall 64. In one embodiment, as shown in FIG. 3, the first end wall 62 is connected to a portion of the first end edge 24 of the base member 22 and the second end wall 64 is connected to a portion of the second end edge 26 of the base member 22. The first end wall 62 can be positioned substantially perpendicular to the base member 22 adjacent the first end edge 24 of the base member 22. Similarly, the second end wall 64 can be positioned substantially perpendicular to the base member 22 adjacent the second end edge 26 of the base member 22.

Figure 4:
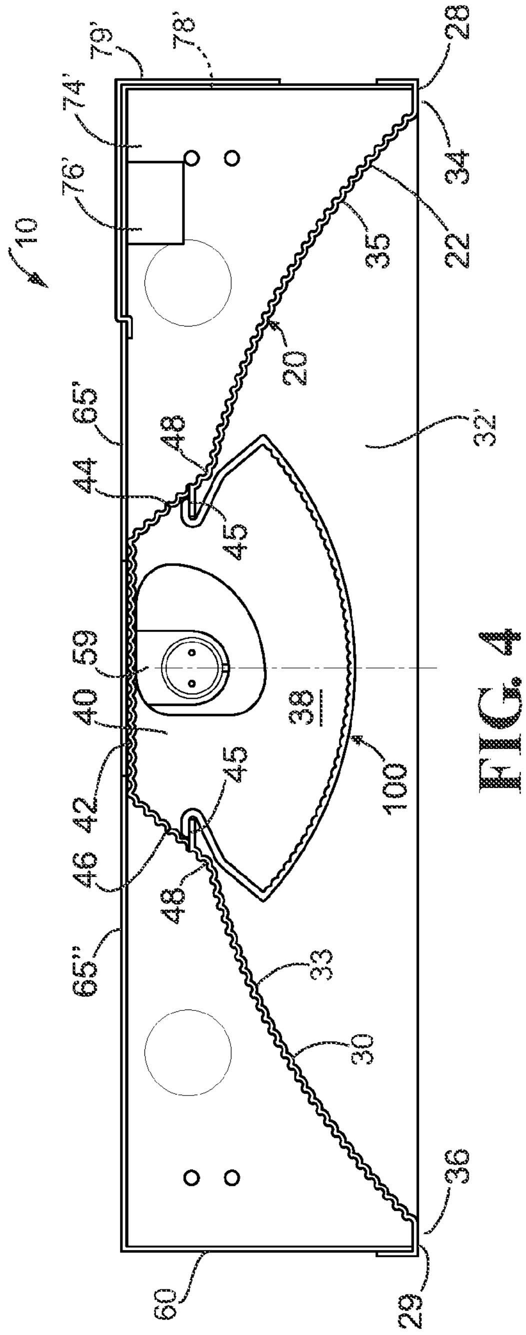
FIG. 4 is a cross-sectional view of the light fixture of FIG. 2, taken along line 5-5.

In one embodiment, as shown in FIG. 4, an electrical contact 59 or receptacle for detachably securing a selected end of the existing fluorescent light source 12' thereto is mounted onto a portion of the base surface 30 of the base member 22. In other embodiments, the electrical contact 59 may be mounted to any appropriate surface within the reflector assembly 20 or the housing 60.

Figure 6:
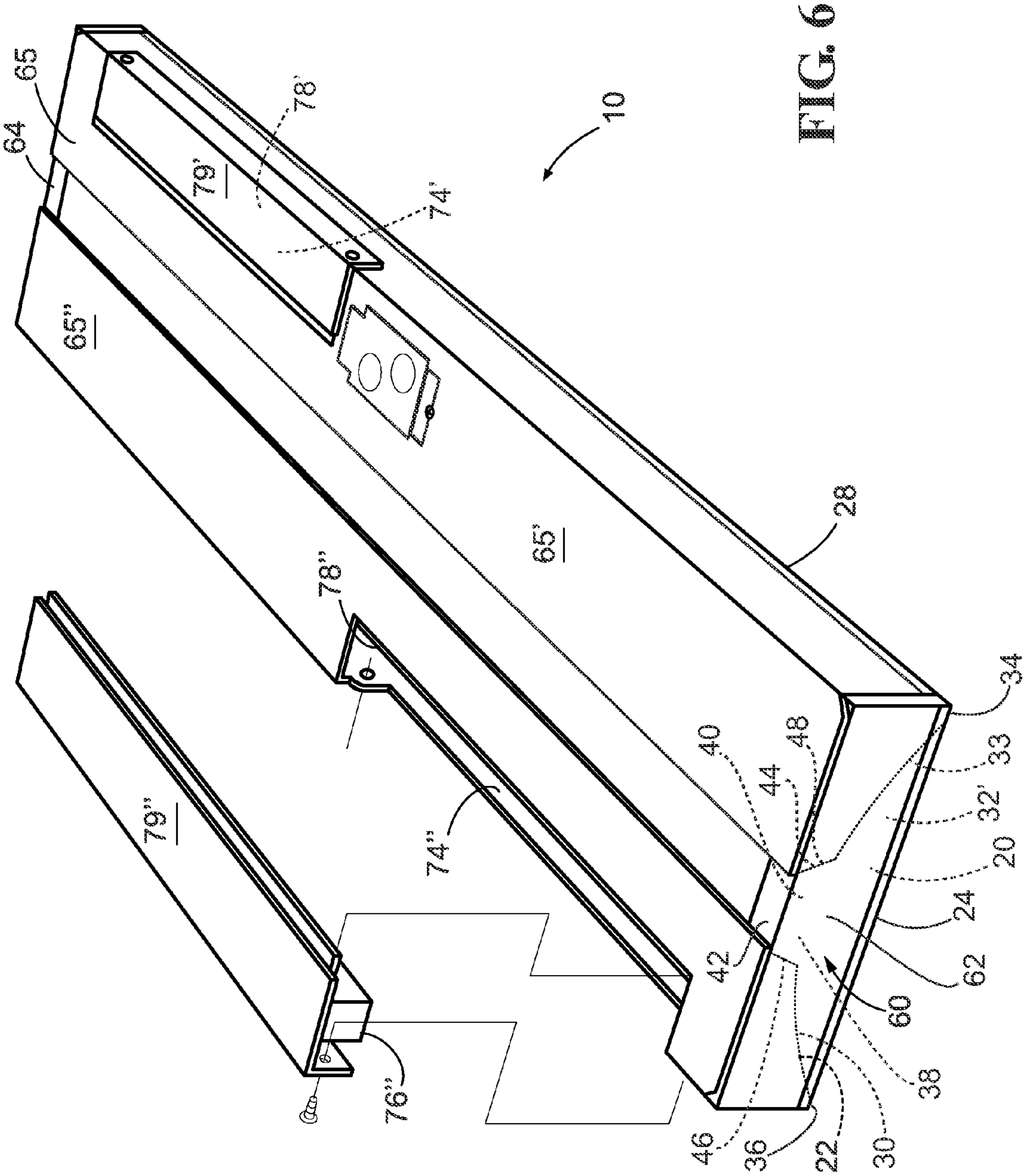
FIG. 6 is an exploded top perspective view of the light fixture of FIG. 1.
Figure 7:
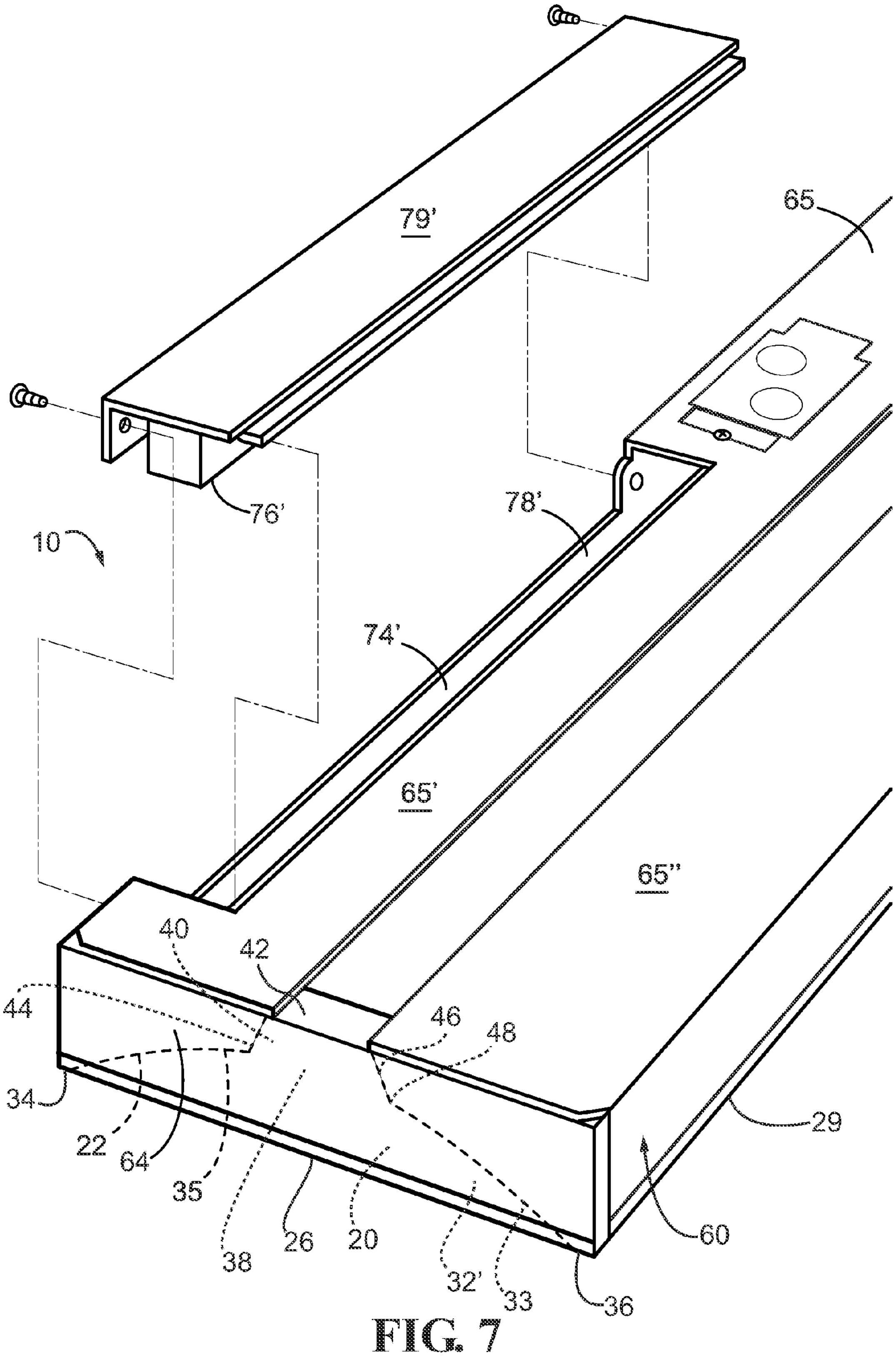
FIG. 7 is a partial exploded top perspective view of the light fixture of FIG. 1.

As shown in FIGS. 6 and 7, the housing 60 of the light fixture 10 also can include at least one angled cover 65', which is exemplarily illustrated as being a pair of angled covers 65'

The light fixture 10 includes at least one conventional ballast 76' constructed and arranged for electrically connecting the fluorescent light source 12' to an external power source. In one embodiment, the ballast 76' is positioned within the interior of the first ballast enclosure 74' (FIG. 7). In order to access the ballast 76', a portion of the first angled cover 65' of the housing 60 of the light fixture 10 defines a first port 78' that is in communication with the interior of the first ballast enclosure 74'. The housing 60 may also include a first closure plate 79' that is constructed and arranged for releasable connection to the first angled cover 65'. In a closed position, the first closure plate 79' is in substantial registration with the first port 78' so that the ballast 76' positioned within the first ballast enclosure 74' can be selectively enclosed.

Similar to the first angled cover 65', the second angled cover 65" may include a second ballast enclosure 74" (FIG. 6). The second ballast enclosure 74" can remain empty or a second ballast 76" can be positioned within the interior of the second ballast enclosure 74" as the electrical demands of the use of the light fixture 10 dictate. As one of skill in the art would understand, the second ballast 76" can be in electrical communication with the fluorescent light source 12' and the external power source. In order to access the second ballast 76", a portion of the second angled cover 65" of the housing 60 of the light fixture 10 can define a second port 78" that is in communication with the second ballast enclosure 74". A second closure plate 79" is provided that is constructed and arranged for releasable connection to the second angled cover 65" such that, in a closed position, the second closure plate 79" is in substantial registration with the second port 78". Thus, the second ballast 76" positioned in the second ballast enclosure 74" can be selectively enclosed.

Figure 8:
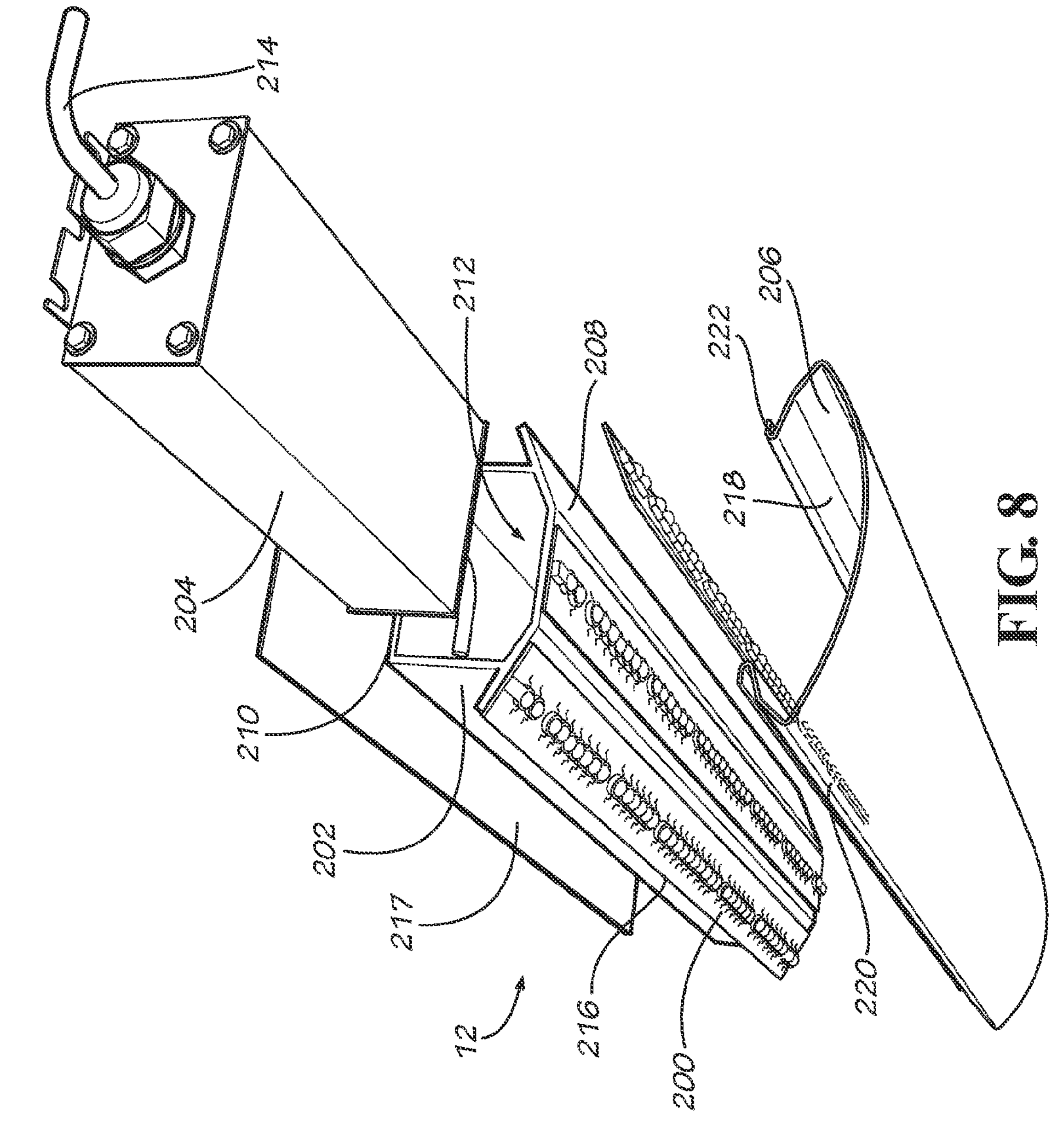
FIG. 8 is an exploded bottom perspective view of one embodiment of the LED lighting assembly of the present invention.
Figure 9:
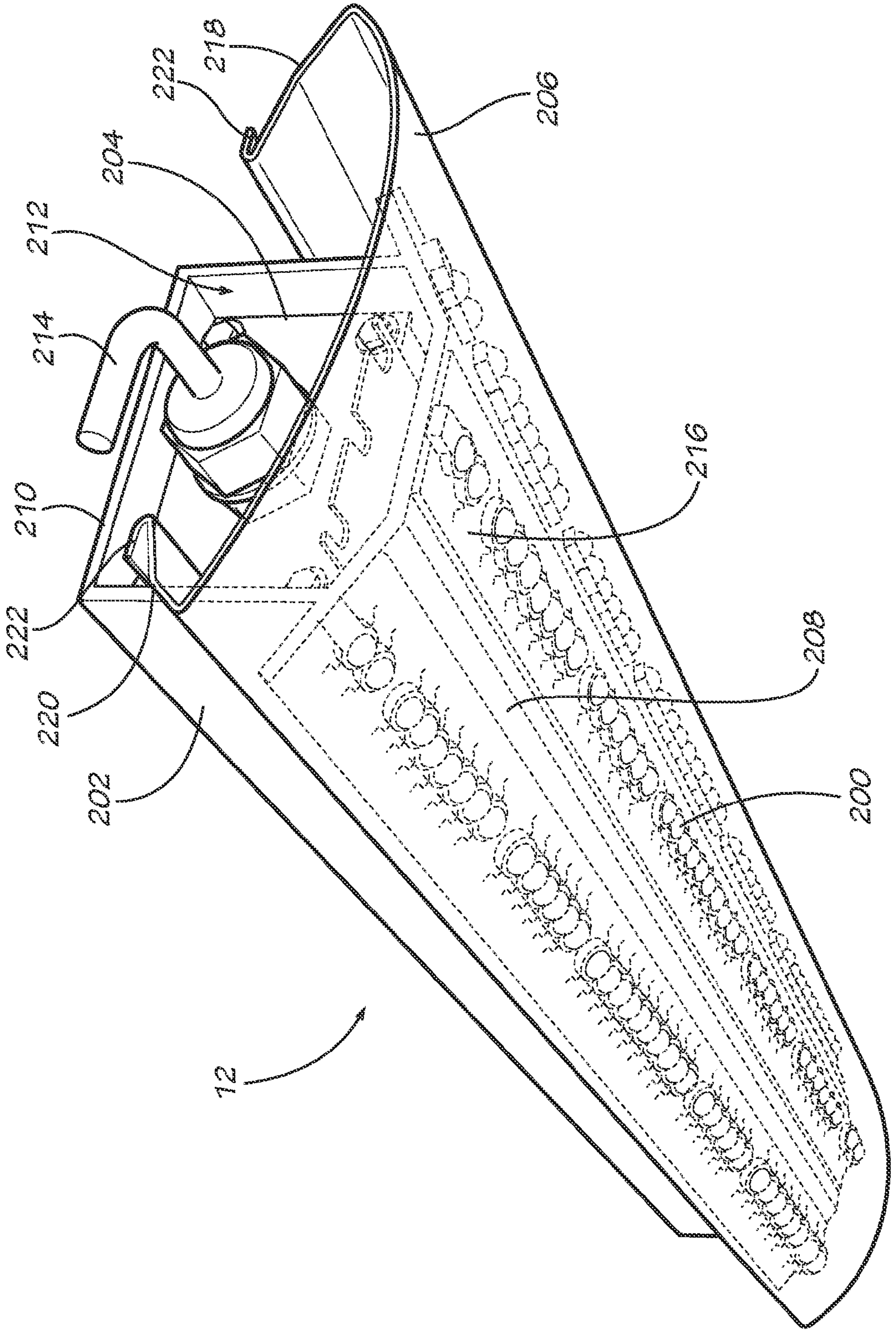
FIG. 9 is a bottom perspective view of the LED lighting assembly of FIG. 8.

In some embodiments, as shown in FIGS. 10-13, the fluorescent light source 12' may be replaced with an LED lighting assembly 12. The LED lighting assembly 12, as illustrated in FIGS. 8 and 9, includes a plurality of light emitting diodes ("LEDs") 200, an extrusion 202, an LED driver 204, and a diffuser 206.

The LEDs 200 may be single-die or multi-die light emitting diodes, DC or AC, or can be organic light emitting diodes ("O-LEDs"). The LED lighting assembly 12 need not use only white LEDs 200. Rather color or multicolor LEDs 200 may be provided. Nor must all of the LEDs 200 within the LED lighting assembly 12 be the same color.

The extrusion 202 may be formed of any thermally conductive material including but not limited to aluminum. The extrusion 202 has an external lower surface 208, an external upper surface 210, and an interior aperture 212. The LEDS 200 are thermally and mechanically affixed to the external lower surface 208. The external lower surface 208 may have any shape including but not limited to linear, curved, parabolic, arched, rectilinear, rhombic, and triangular. The LED driver 204 is inserted into the interior aperture 212. The interior aperture 212 may be of any shape to accommodate the LED driver 204. Leads 214 from the LED driver 204 extend outwardly from the ends of the interior aperture 212.

The external upper surface 210 may have any shape so long as the external lower surface 208 and the external upper surface 210 define the interior aperture 212 for receiving the LED driver 204. It may be preferable that the external upper surface 210 be shaped to at least partially conform to the shape of the trough 40, which is located within the reflector assembly 20. Conforming the shape of the external upper surface 210 to the trough 40 provides a heat transfer path between the LED lighting assembly 12 and the reflector assembly 20, allowing heat to effectively dissipate from LEDs 200.

In some embodiments, the LEDs 200 are mounted to a printed circuit board ("PCB") 216, which is in turn affixed to the external lower surface 208. The PCB 216 can be, among other things, metal core board, FR4 board, CHM1 board, etc. Any number of LEDs 200 may be mounted on the PCB 216 at any number of locations or positions on the PCB 216.

In some embodiments, a thermal interface material 217 may be included between the external upper surface 210 and the top surface 42 to improve heat conduction from LEDs 200. The thermal interface material 217 may be formed from any thermally conductive material including but not limited to thermal grease, paste, thermal epoxy, and thermal pads. In other embodiments, the thermal interface material 217 is also included between the PCB 216 and the external lower surface 208 to improve heat conduction from the LEDs 200.

The diffuser 206 is positioned below the LEDs 200 so that light emitted from the LEDs 200 is diffused. The diffuser 206 may have any shape including curved, rectilinear, parabolic, or any other appropriate shape to diffuse light emitted from the LEDs 200 as desired. The diffuser 206 may be formed of plastic or any other suitable material that allows a sufficient amount of light to transmit through the diffuser 206. The diffuser 206 is connected to the external lower surface 208 via any appropriate mechanical or chemical means. In some embodiments, the diffuser 206 has arms 218, 220 that snap-fit over the edges of the external lower surface 208. In other embodiments, the diffuser 206 may be attached to the external lower surface 208 by mechanical fasteners.

Prior to installing the LED lighting assembly 12 into the light fixture 10, the existing fluorescent light source 12' and associated electrical connections must be removed or bypassed. As an initial step, the existing fluorescent lens assembly 100 is removed by disengaging the fluorescent lens assembly 100 from the reflector assembly 20. Next, the existing fluorescent The existing ballast 76' is then bypassed or removed by accessing the ballast 76' via the first port 78'. In some embodiments, the second ballast 76" is also bypassed or removed by accessing the second ballast 76" via the second port 78".

As shown in FIGS. 10-13, the external upper surface 210 of the LED lighting assembly 12 is then placed in contact with the top surface 42 of the trough 40. In some embodiments, the thermal interface material 217 may be inserted or applied to the external upper surface 210 prior to placing it in contact with the top surface 42. The leads 214 from the LED driver 204 are threaded through the housing 60 and brought into a junction box (not shown).

Figure 10:
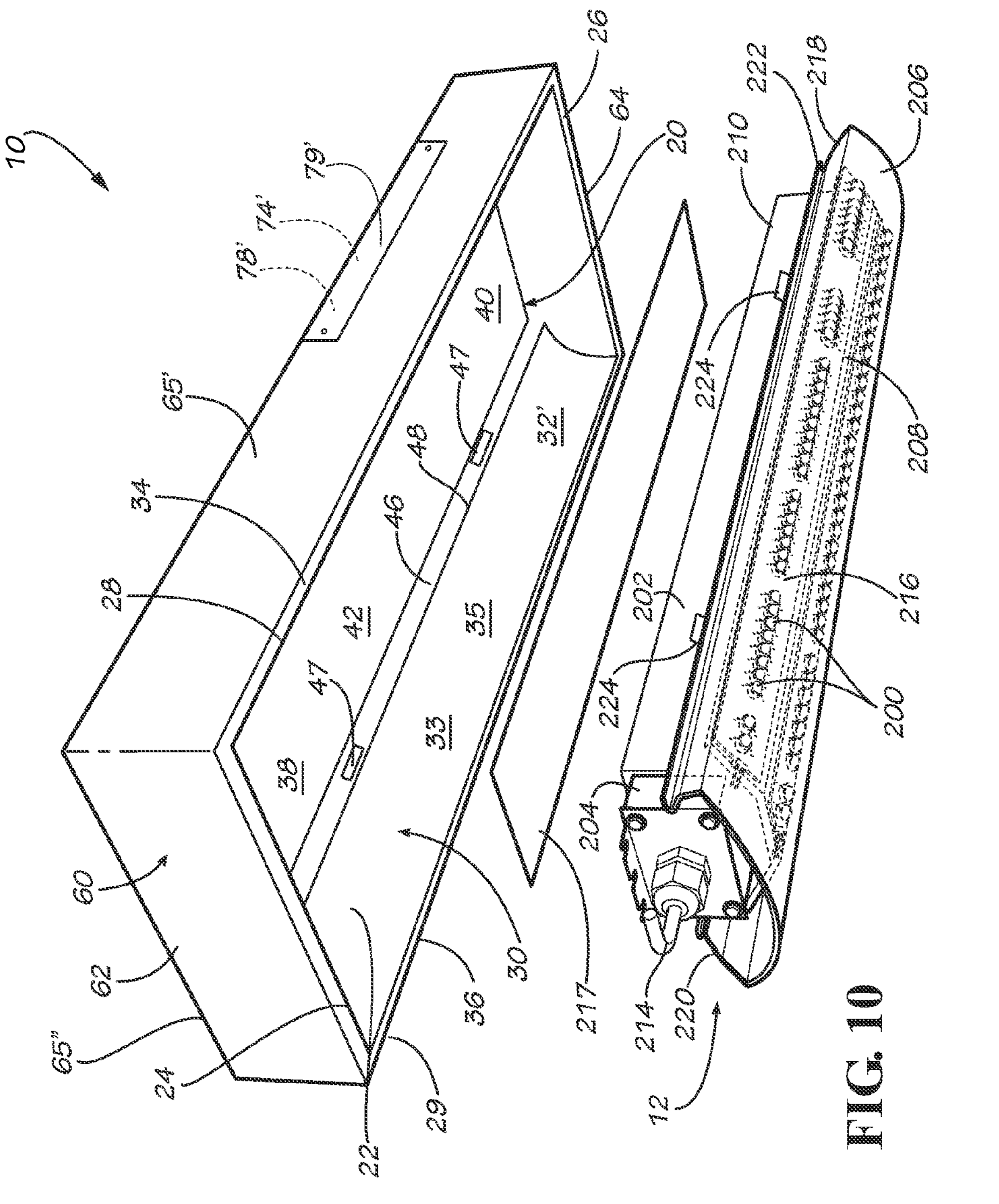
FIG. 10 is an exploded bottom perspective view of the light fixture of FIG. 1 with the LED lighting assembly of FIG. 8.
Figure 11:
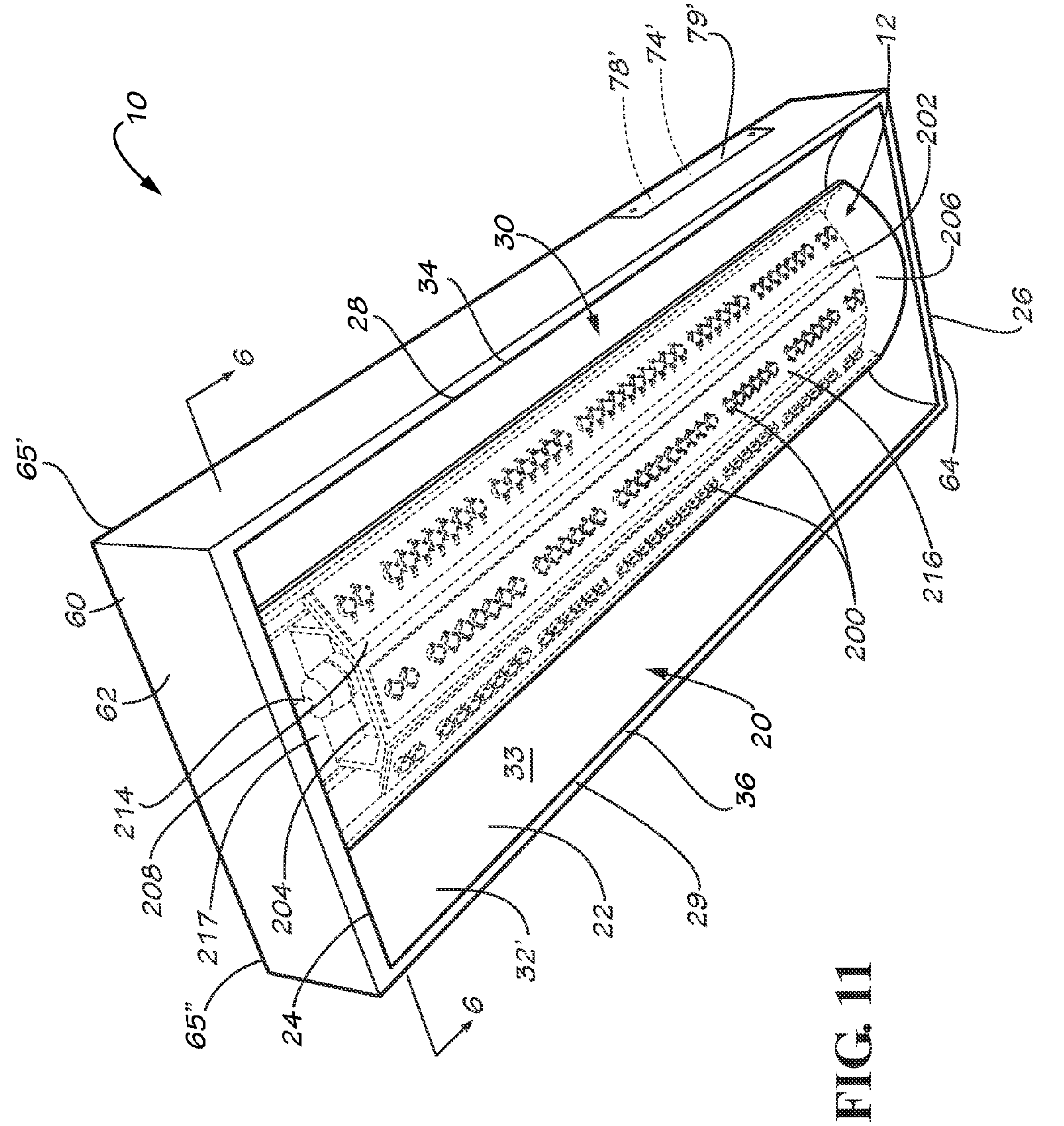
FIG. 11 is bottom perspective view of the light fixture of FIG. 1 with the LED lighting assembly of FIG. 8.
Figure 12:
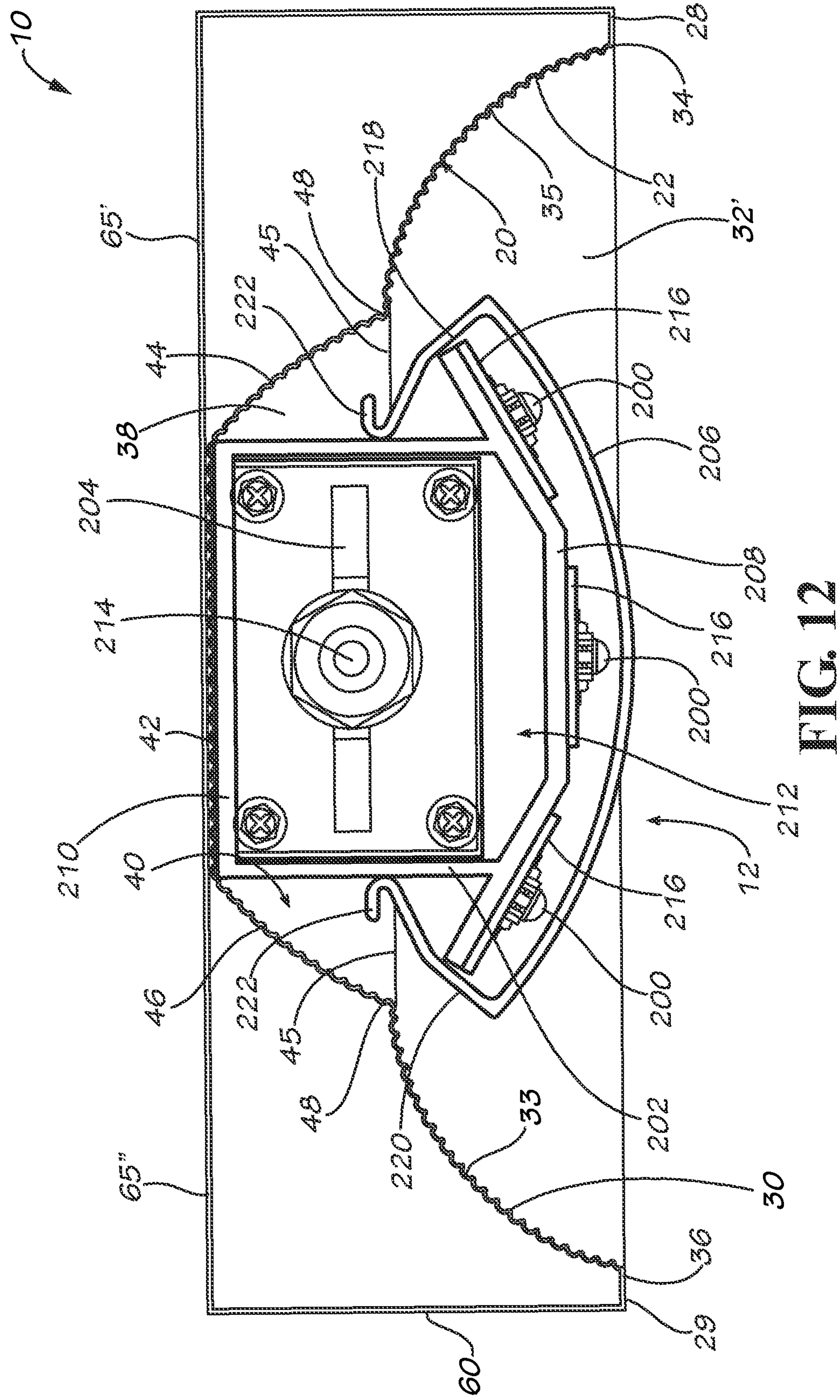
FIG. 12 is a cross-sectional view of the light fixture of FIG. 11, taken along line 6-6.
Figure 13:
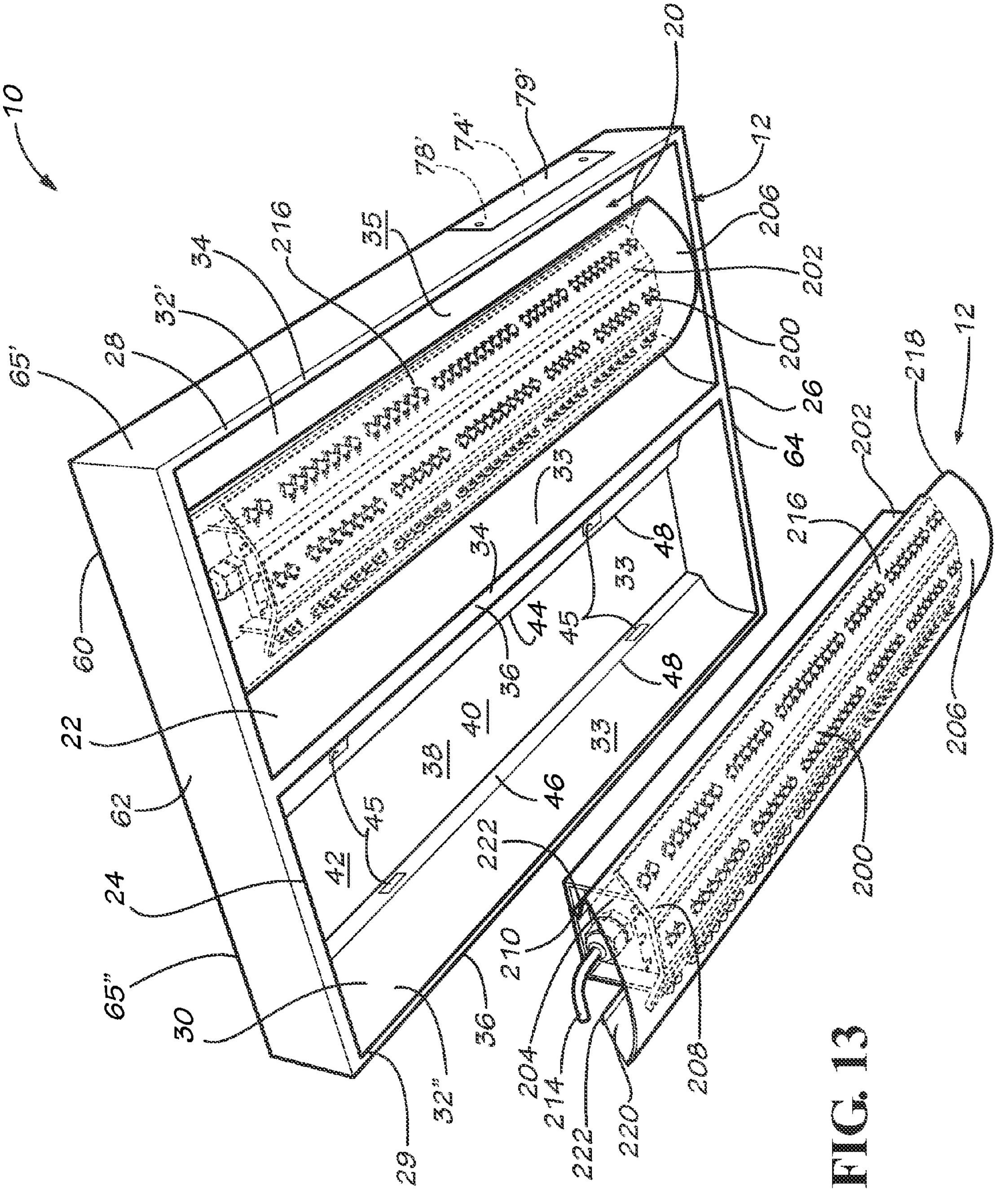
FIG. 13 is an exploded bottom perspective view of the light fixture of FIG. 5 with the LED lighting assembly of FIG. 8.

The LED lighting assembly 12 may then be affixed to the reflector assembly 20 by any appropriate means. In some embodiments, the LED lighting assembly 12 affixes to the reflector assembly 20 in the same manner in which the fluorescent lens assembly 100 was previously affixed to the reflector assembly 20. In one embodiment, as shown in FIGS. 12 and 13, each of the first and second side trough surfaces 44, 46 has at least one male protrusion 45 (as shown in FIGS. 4 and 5), where the male protrusion 45 may be a tab extending inwardly into the interior of the trough 40. Similarly, each of the first and second arms 218, 220 of the diffuser 206 has an end portion 222 that is sized and shaped for detachable engagement with the at least one male protrusion 45 in each of the respective first and second side trough surfaces 44, 46 (same as shown in FIGS. 4 and 5). Alternatively, as shown in FIG. 10, each of the first and second side trough surfaces 44, 46 can define at least one slot 47 (same as shown in FIG. 1) that is constructed and arranged to receive a male protrusion 224 projecting from the end portion 222 of each of the respective first and second arms 218, 220 of the diffuser 206.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A light fixture comprising:

a. a housing comprising a pair of sides that extend from a base surface to a first height to form a three dimensional structure;

b. a reflector assembly comprising:

i. a thermally conductive and longitudinally extending trough comprising a top surface and opposing side surfaces, wherein the top surface of the trough contacts at least a portion of the base surface of the housing and the opposing side surfaces of the trough extend from the top surface of the trough to a second height that is less than the first height of the pair of sides of the housing, and each of the opposing side surfaces comprise at least one male protrusion; and ii. a pair of curved reflective surfaces, wherein each curved reflective surface encloses at least a portion of a lateral gap located between one of the opposing side surfaces of the trough and one side of the pair of sides of the housing and is vertically positioned within the portion of the housing defined by a plane that is substantially parallel to the first height of the pair of sides of the housing and a plane substantially parallel to the second height of the opposing side surfaces of the trough; and c. an LED lighting assembly comprising:

i. a thermally conductive extrusion comprising an external lower surface and an external upper surface, wherein the external upper surface substantially conforms to the shape of the top surface of the trough so that the external upper surface of the extrusion contacts substantially all of the top surface of the trough;

ii. a plurality of light emitting diodes supported on the external lower surface of the extrusion; and iii. a diffuser positioned below the plurality of light emitting diodes, wherein the diffuser comprises arms that releasably engage the extrusion, wherein each arm comprises an end portion that releasably engages the at least one male protrusion that extends from the adjacent side surface of the trough so that the extrusion is connected to the trough via the diffuser;

wherein heat generated by the plurality of light emitting diodes is removed from the light fixture via a thermal conduction path formed between the extrusion of the LED lighting assembly and the trough of the reflector assembly of the light fixture.

2. The light fixture of claim 1, wherein the plurality of light emitting diodes are positioned on a first side of a printed circuit board.

3. The light fixture of claim 2, wherein a second side of the printed circuit board is positioned adjacent the external lower surface of the extrusion.

4. The light fixture of claim 3, further comprising a thermally conductive material positioned between the second side of the printed circuit board and the external lower surface of the extrusion or between at least a portion of the external upper surface of the extrusion and the top surface of the trough.

5. The light fixture of claim 4, wherein the extrusion further comprises an interior aperture configured to receive a power source.

6. The light fixture of claim 1, wherein the diffuser snap-fits onto the extrusion.

7. A light fixture comprising:

a. a housing comprising a pair of sides that extend from a base surface to a first height to form a three dimensional structure;

b. a reflector assembly comprising:

i. a thermally conductive and longitudinally extending trough comprising a top surface and opposing side surfaces, wherein the top surface of the trough contacts at least a portion of the base surface of the housing and the opposing side surfaces of the trough extend from the top surface of the trough to a second height that is less than the first height of the pair of sides of the housing, and each of the opposing side surfaces comprise at least one male protrusion; and ii. a pair of curved reflective surfaces, wherein each curved reflective surface encloses at least a portion of a lateral gap located between one of the opposing side surfaces of the trough and one side of the pair of sides of the housing and is vertically positioned within the portion of the housing defined by a plane that is substantially parallel to the first height of the pair of sides of the housing and a plane substantially parallel to the second height of the opposing side surfaces of the trough; and c. an LED lighting assembly comprising:

i. a thermally conductive extrusion comprising an external lower surface, an external upper surface, and an interior aperture configured to receive a power source, wherein the external upper surface substantially conforms to the shape of the top surface of the trough so that the external upper surface of the extrusion contacts substantially all of the top surface of the trough;

ii. a plurality of light emitting diodes supported on the external lower surface of the extrusion; and iii. a diffuser positioned below the plurality of light emitting diodes, wherein the diffuser comprises arms that releasably engage the extrusion, wherein each arm comprises an end portion that releasably engages the at least one male protrusion that extends from the adjacent side surface of the trough so that the extrusion is connected to the trough via the diffuser;

wherein heat generated by the plurality of light emitting diodes is removed from the light fixture via a thermal conduction path formed between the extrusion of the LED lighting assembly and the trough of the reflector assembly of the light fixture.

8. The LED lighting assembly of claim 7, wherein the plurality of light emitting diodes are positioned on a first side of a printed circuit board.

9. The LED lighting assembly of claim 8, wherein a second side of the printed circuit board is positioned adjacent the external lower surface of the extrusion.

10. The LED lighting assembly of claim 9, further comprising a thermally conductive material positioned between the second side of the printed circuit board and the external lower surface of the extrusion or between at least a portion of the external upper surface of the extrusion and the top surface of the trough.

11. The LED lighting assembly of claim 7, wherein the diffuser snap-fits onto the extrusion.

12. A method of replacing at least one light source with an LED lighting assembly in an existing light fixture comprising (i) a housing comprising a pair of sides that extend from a base surface to a first height to form a three dimensional structure, (ii) a reflector assembly comprising (A) at least one thermally conductive and longitudinally extending trough comprising a top surface and opposing side surfaces, wherein the top surface of the trough contacts at least a portion of the base surface of the housing and the opposing side surfaces of the trough extend from the top surface of the trough to a second height that is less than the first height of the pair of sides of the housing, and each of the opposing side surfaces comprise at least one male protrusion; and (B) a pair of curved reflective surfaces, wherein each curved reflective surface encloses at least a portion of a lateral gap located between one of the opposing side surfaces of the at least one trough and one side of the pair of sides of the housing and is vertically positioned within the portion of the housing defined by a plane that is substantially parallel to the first height of the pair of sides of the housing and a plane substantially parallel to the second height of the opposing side surfaces of the trough, (iii) the at least one light source, and (iv) at least one lens assembly, the method comprising:

a. removing the at least one lens assembly;

b. removing the at least one light source;

c. providing at least one LED lighting assembly, wherein the LED lighting assembly comprises:

i. a thermally conductive extrusion comprising an external lower surface, an external upper surface, and an interior aperture configured to receive a power source, wherein the external upper surface substantially conforms to the shape of the top surface of the trough so that the external upper surface of the extrusion contacts substantially all of the top surface of the trough;

ii. a plurality of light emitting diodes supported on the external lower surface of the extrusion; and iii. a diffuser positioned below the plurality of light emitting diodes, wherein the diffuser comprises arms that releasably engage the extrusion, wherein each arm comprises an end portion that releasably engages the at least one male protrusion that extends from the adjacent side surface of the trough so that the extrusion is connected to the trough via the diffuser;

d. positioning the external upper surface of the extrusion of the at least one LED lighting assembly at least partially within the at least one longitudinally extending trough; and e. connecting the diffuser of the at least one LED lighting assembly to the at least one longitudinally extending trough, wherein heat generated by the plurality of light emitting diodes is removed from the light fixture via a thermal conduction path formed between the extrusion of the LED lighting assembly and the trough of the reflector assembly of the light fixture.

13. The method of claim 12, further comprising placing a thermally conductive material between at least a portion of the external upper surface of the extrusion of the at least one LED lighting assembly and the top surface of the at least one trough.

* * * * *